(12) United States Patent
Dietz

(10) Patent No.: US 10,498,120 B2
(45) Date of Patent: Dec. 3, 2019

(54) WEDGE CABLE CLAMP

(71) Applicant: Hubbell Incorporated, Shelton, CT (US)

(72) Inventor: William Henry Dietz, Branford, CT (US)

(*) Notice: Subject to any disclaimer, the term of this patent is extended or adjusted under 35 U.S.C. 154(b) by 0 days.

(21) Appl. No.: 15/957,324

(22) Filed: Apr. 19, 2018

(65) Prior Publication Data

US 2018/0309276 A1  Oct. 25, 2018

Related U.S. Application Data

(60) Provisional application No. 62/488,349, filed on Apr. 21, 2017.

(51) Int. Cl.
  *H02G 3/04* (2006.01)
  *F16L 3/10* (2006.01)
  *F16M 13/02* (2006.01)
  *B66B 7/06* (2006.01)

(52) U.S. Cl.
  CPC ............ *H02G 3/0456* (2013.01); *F16L 3/10* (2013.01); *F16M 13/02* (2013.01); *B66B 7/064* (2013.01)

(58) Field of Classification Search
  CPC ...... H02G 3/0456; H02G 3/32; H02G 15/007; F16L 3/10; F16M 13/02; B66B 7/064; A63B 29/024; A63B 2225/09
  USPC .......... 248/317, 320, 328, 337, 51, 55, 74.2, 248/74.4; 24/136 K, 136 L
  See application file for complete search history.

(56) References Cited

U.S. PATENT DOCUMENTS

| | | | | |
|---|---|---|---|---|
| 2,915,267 | A * | 12/1959 | Kaysing | F16L 3/10 248/67.5 |
| 4,805,479 | A * | 2/1989 | Brightwell | F16C 1/105 74/502.4 |
| 6,126,122 | A * | 10/2000 | Ismert | F16L 3/221 24/271 |
| 2006/0242805 | A1* | 11/2006 | Coleman | F16B 5/0692 24/462 |
| 2007/0278357 | A1* | 12/2007 | Pizzi | F16L 3/1025 248/74.1 |
| 2013/0206938 | A1* | 8/2013 | Clouser | F16M 13/022 248/219.4 |

(Continued)

OTHER PUBLICATIONS

Draka FCSD-3, Flat Cable Installation Guide, Version 1114, retrieved from the Internet on Apr. 17, 2017, URL: https://www.prysmiangroup.com/sites/default/tiles/atoms/files/Flat-Cable-Installation-Guide_2014.pdf, 24 pages.

*Primary Examiner* — Muhammad Ijaz
(74) *Attorney, Agent, or Firm* — Verrill; John W. Powell

(57) ABSTRACT

A cable clamp, comprising a base member including a surface configured to receive and engage with a side of a cable, a first leg portion and a second leg portion projecting from the surface. The first leg portion includes a first engagement surface having a plurality of teeth and the second leg portion includes a second engagement surface. There is a sliding member including a surface in opposing relation to the surface of the base and first and second engagement members. The first engagement member has a plurality of teeth mated to the teeth of the first engagement surface and the second engagement member is frictionally mated to the second engagement surface. The sliding member moves with respect to base member in a first direction but not in a second, opposite direction, due to the interaction of the teeth.

24 Claims, 9 Drawing Sheets

(56) References Cited

U.S. PATENT DOCUMENTS

2018/0309276 A1* 10/2018 Dietz .................. H02G 3/0456

* cited by examiner

WEDGE CABLE CLAMP

CROSS-REFERENCE TO RELATED APPLICATIONS

This application claims the benefit of priority to U.S. Provisional Application No. 62/488,349, filed Apr. 21, 2017, which is incorporated herein by reference.

FIELD OF THE INVENTION

This invention relates to a wedge cable clamp and more particularly to such a wedge cable clamp that is lockable and that provides an audible indication as it is being tightened.

BACKGROUND OF THE INVENTION

Wedge cable clamps are used for cable strain relief in applications such as elevators to affix travelling control and power cables to a wall of an elevator shaft with an end of the cable connected to an elevator car. As shown in FIG. 1, a typical installation provides elevator shaft 10, in which elevator car 12 travels, with travelling control and power cable 14 in the form of a flat cable. Cable 14 runs along a wall 16 of elevator shaft 10 and connects to elevator car 12 by means of a bracket 18 affixed to the bottom of the car. A wedge cable clamp 20 is affixed to wall 16, typically at the mid-point of the elevator shaft, to secure the control and power cable to the wall 16.

In this example installation, one end of cable 14 is interconnected to elevator car 12 to provide the car with power and control signals to provide electric power to the car and control signals to allow for operation of the car. At the other end of the cable (not shown), cable 14 is connected to a power source and a control system for controlling the operation of the elevator car. Between the wedge clamp 20 and the bracket 18 on the elevator car 12, the control and power cable 14 is not fixed to wall 16 and is free to move away from the wall as elevator car 12 moves up the elevator shaft 10, eventually reaching the top of the shaft. As can be seen at the bottom of shaft 10, control and power cable 16 is provided a sufficient amount of slack 22 to allow for proper interconnection to bracket 18 when the elevator car 12 is at its lowest point (as shown). The amount of slack 22 also provides a sufficient amount of cable length for elevator car 12 to reach its highest point in elevator shaft 10 (not shown).

The wedge shaped clamp 20 may include a wedge shaped base portion 19 secured to wall 16 and a sliding portion 21, which is slideably mounted in the base portion. Cable 14 is placed in base portion 19 on a flat bottom surface and sliding portion 21 is inserted into guide rails on each side of the base portion. As the sliding portion 21 is moved within the base portion, a flat surface on the sliding portion, which opposes the flat surface of the base portion, comes into contact with the cable and applies pressure on the cable to secure it in place. During installation and removal of the cable, a hammer is typically used to apply force to the sliding portion 21 to secure it in place and then to loosen it to release the cable.

With the above-described type of clamp, the cable is held in place by the downward force of the wedge clamp applied to the cable and the wedge clamp is held in place due friction between the sliding portion 21 and the cable. Therefore, the sliding portion is susceptible to loosening over time. Moreover, the amount of force applied to the sliding portion 21 to hold it in place is not well controlled and can cause damage to the cable during installation if excessive pressure is applied.

BRIEF SUMMARY OF THE INVENTION

It is another object of the invention to provide a wedge shaped cable clamp that is lockable and subsequently releasable.

It is another object of the invention to provide a wedge shaped cable clamp that provides an audible indication when the clamp is being tightened.

It is an object of the invention to provide a wedge shaped cable clamp that is easy to use.

It is another object of the invention to provide a wedge shaped cable clamp that is capable of securing and releasing a cable without the use of a tool.

In one aspect the invention includes a cable clamp with a base member including a surface configured to receive and engage with a side of a cable. There is a first leg portion projecting from a first side of the surface and a second leg portion projecting from a second side of the surface, the first leg portion including a first engagement surface having a plurality of teeth and the second leg portion having second engagement surface. There is a sliding member including a surface being spaced from and in opposing relation to the surface of the base member and configured to engage with another side of the cable. The sliding member further including a first engagement member extending along a first side of the surface of the sliding member and having a plurality of teeth, and a second engagement member extending along a second side of the surface. The first engagement member is mated to the first engagement surface such that the teeth of the first engagement surface engage with the teeth of the first engagement member and the second engagement member is frictionally mated to the second engagement surface. The sliding member is movable with respect to base member along a length of the base member in a first direction, but is not moveable with respect to the base member along its length in a second direction, opposite the first direction, due to the interaction of the teeth of the engagement surface with the teeth of the first engagement member.

In other aspects of the invention, one or more of the following features may be included. The teeth of the engagement surface and the teeth of the first engagement member may form a ratchet, allowing movement only in the first direction. When the sliding member moves in the first direction the teeth of first engagement surface may interact with the teeth of the first engagement member to produce audible sounds. The first engagement member may include a convex member having a central region and wherein the plurality of teeth are disposed on the convex member in the central region. The convex member may include a first leg affixed to the first side of the surface of the sliding member at first location and a second leg affixed to the first side of the surface of the sliding member at a second location spaced from the first location along a length of the sliding member. A gap may be formed between the convex member and the first side of the surface of the sliding member between the first and second legs; and the convex member may be elastically deformable in a direction toward the first side of the surface of the sliding member. Each tooth on the convex member may include a front surface and a back surface and each pair of teeth may be separated by a notch. The front surface may be disposed at an acute angle relative to an adjacent notch and the back surface may be disposed at a perpendicular angle relative to an adjacent notch. Each tooth on the first engagement surface may include a front surface and a back surface and each pair of teeth may be separated by a notch. The back surface may be disposed at an acute angle relative to an adjacent notch and the front surface may be disposed at a perpendicular angle relative to an adjacent notch. The acute angle of the front surface of each tooth of the convex member may be substantially the same as the acute angle of the back surface of each tooth on the engagement surface. When the sliding member is not moving relative to the base member each tooth of the convex member may be seated in a notch in the first engagement surface and each tooth of the first engagement surface is seated in a notch of the convex member.

In further aspects of the invention, one or more of the following features may be included. When the sliding member is moved in the first direction, the front surface of each tooth of the convex member may impact the back surface of a corresponding tooth on the first engagement member causing the front surface of each tooth of the convex member to ride up the back surface of a corresponding tooth on the first engagement member deforming the convex member in the direction of the first side of the sliding member until each tooth of the convex member rides over the complementary tooth of the first engagement member and causes the convex member to elastically return to its normal position as each tooth of the convex member is seated in a next notch of the first engagement member and each tooth of the first engagement member is seated in a next notch of the convex member. The back surface of each tooth of the convex member may abut the front surface of each corresponding tooth of the first engagement member such that their perpendicular surfaces are in opposition thereby preventing movement in the second direction. The first leg portion and the second leg portion each may have a height which decreases from a first end of the base member to a second end of the base member along the length of the base member and the first and second leg portions include first and second guide rails, respectively, on which are disposed the first and second engagement surfaces, respectively. As a result of the decreasing height of the first and second leg portions, the first and second guide rails may be angled downwardly from the first end to the second end of the base member. The first and second engagement members may be disposed at an angle relative to the surface of the sliding member corresponding to the angle of the first and second guide rails, such that as the sliding member is moved with respect to base member along its length in the first direction, the spacing between the surface of the sliding member and the surface of the base member decreases, causing increasing pressure to be applied to the cable. The convex member may further include a tab disposed in the central region of the convex member to disengage the teeth on the convex member from the teeth on the first engagement member, to thereby allow movement of the sliding member in the second direction, by the application of pressure on the tab in a direction toward the surface of the base portion of the base member. The tab may project through an opening in the first leg of the base member such that it is actuatable from the exterior of the base member, the opening extending along the length of the first leg and positioned below the first engagement member. One of the second engagement member or the second engagement surface may include a plurality of spring mechanisms to exert force on the sliding member to load the teeth of the engagement member and the teeth of the engagement surface.

In another aspect the invention includes a cable clamp including a base member having a length and a width, the base member including a base portion with a surface configured to receive and engage with a side of a cable. There is a first leg portion extending along the length of the base member and projecting from a first side of the surface and a second leg portion extending along the length of the base member and projecting from a second side of the surface. The second side of the surface being opposite the first side of the surface across the width of the base member; the first leg portion including a first guide rail having an engagement surface including a plurality of teeth; the second leg portion including a second guide rail having an engagement surface. There is a sliding member having a length and a width, the sliding member including a body portion with a surface being spaced from and in opposing relation to the surface of the base portion of the base member and configured to engage with another side of the cable. The sliding member has a first engagement member extending along the length of the sliding member on a first side and the first engagement member including a plurality of teeth. The sliding member also has a second engagement member extending along the length of the sliding member on a second side of the surface and the second side of the surface being opposite the first side of the surface across the width of the body portion. The first engagement member is mated to the engagement surface of the first guide rail of the base member such that the teeth of the engagement surface of the first guide rail engage with the teeth of the first engagement member of the sliding member; and the second engagement member is frictionally mated to the engagement surface of the second guide rail of the base member. The sliding member is movable with respect to base member along its length in the first and second guide rails in a first direction, but is not moveable with respect to the base member along its length in a second direction, opposite the first direction, due to the interaction of the teeth of the engagement surface of the first guide rail with the teeth of the first engagement member of the sliding member.

In other aspects of the invention, one or more of the following features may be included. The teeth of the engagement surface of the first guide rail and the teeth of the first engagement member of the sliding member may form a ratchet, allowing movement only in the first direction. When the sliding member moves in the first direction the teeth of the first guide rail may interact with the teeth of the first engagement member to produce audible sounds. The first engagement member may include a convex member having a central region and wherein the plurality of teeth are disposed on the convex member in the central region. The convex member may include a first leg affixed to the first side of the sliding member at first location and a second leg affixed to the first side of the sliding member at a second location spaced from the first location along the length of the sliding member. A gap may be formed between the convex member and the first side of the sliding member between the first and second legs; and the convex member may be elastically deformable in a direction toward the first side of the sliding member. Each tooth on the convex member may include a front surface and a back surface and each pair of teeth may be separated by a notch, the front surface being disposed at an acute angle relative to an adjacent notch and the back surface being disposed at a perpendicular angle relative to an adjacent notch. Each tooth on the first guide rail may include a front surface and a back surface and each pair of teeth may be separated by a notch. The back surface may be disposed at an acute angle relative to an adjacent notch and the front surface may be disposed at a perpendicular angle relative to an adjacent notch. The acute angle of the front surface of each tooth of the convex member may be substantially the same as the acute angle of the back surface of each tooth on the first guide rail; and when the sliding member is not moving relative to the base member each tooth of the convex member is seated in a notch in the first guide rail and each tooth of the first guide rail is seated in a notch of the convex member.

In further aspects of the invention, one or more of the following features may be included. When the sliding member is moved in the first direction, the front surface of each tooth of the convex member may impact the back surface of a corresponding tooth on the first guide rail causing the front surface of each tooth of the convex member to ride up the back surface of a corresponding tooth on the first guide rail deforming the convex member in the direction of the first side of the sliding member until each tooth of the convex member rides over the complementary tooth of the first guide rail and causes the convex member to elastically return to its normal position as each tooth of the convex member is seated in a next notch of the first guide rail and each tooth of the first guide rail is seated in a next notch of the convex member. The back surface of each tooth of the convex member may abut the front surface of each corresponding tooth of the first guide rail wherein their perpendicular surfaces are in opposition thereby preventing movement in the second direction. The first leg portion and the second leg portion may each have a height which decreases from a first end to a second end along the length of the base member and wherein as a result of the decreasing height of the first and second leg portions, the first and second guide rails may be angled downwardly from the first end to the second end of the base member. The first and second engagement members may be disposed at an angle relative to the surface of the body portion of the sliding member corresponding to the angle of the first and second guide rails, such that as the sliding member is moved with respect to base member along its length in the first direction, the spacing between the surface of the body portion and the surface of the base portion decreases, causing increasing pressure to be applied to the cable. The convex member may further include a tab disposed in the central region of the convex member to disengage the teeth on the convex member from the teeth on the first guide rail, to thereby allow movement of the sliding member in the second direction, by the application of pressure on the tab in a direction toward the surface of the base portion of the base member. The tab may project through an opening in the first leg of the base member such that it is actuatable from the exterior of the base member, the opening extending along the length of the first leg and positioned below the first rail. One of the second engagement member or the second engagement surface may include a plurality of spring mechanisms to exert force on the sliding member to load the teeth of the engagement member and the teeth of the engagement surface.

DETAILED DESCRIPTION OF THE INVENTION

The present invention will now be described more fully herein with reference to an exemplary embodiment, an example of which is illustrated in the accompanying drawings. Embodiments and implementations set forth in the following detailed description do not represent all embodiments and implementations of the claimed invention. One skilled in the art will appreciate that the present teachings can be practiced with embodiments other than those summarized or disclosed below by the Figures and Detailed Description of the Invention to follow.

Further, the wedge cable clamp of the present disclosure is described herein with regard to an elevator power and control cable; however, there may be other equally suitable applications of the present invention outside of the context of elevator power and control cables. The present invention may be applicable to any suitable applications for securing a cable to a surface and is particularly useful in securing a flat cable to a surface is a space with limited clearance.

Figure 2:
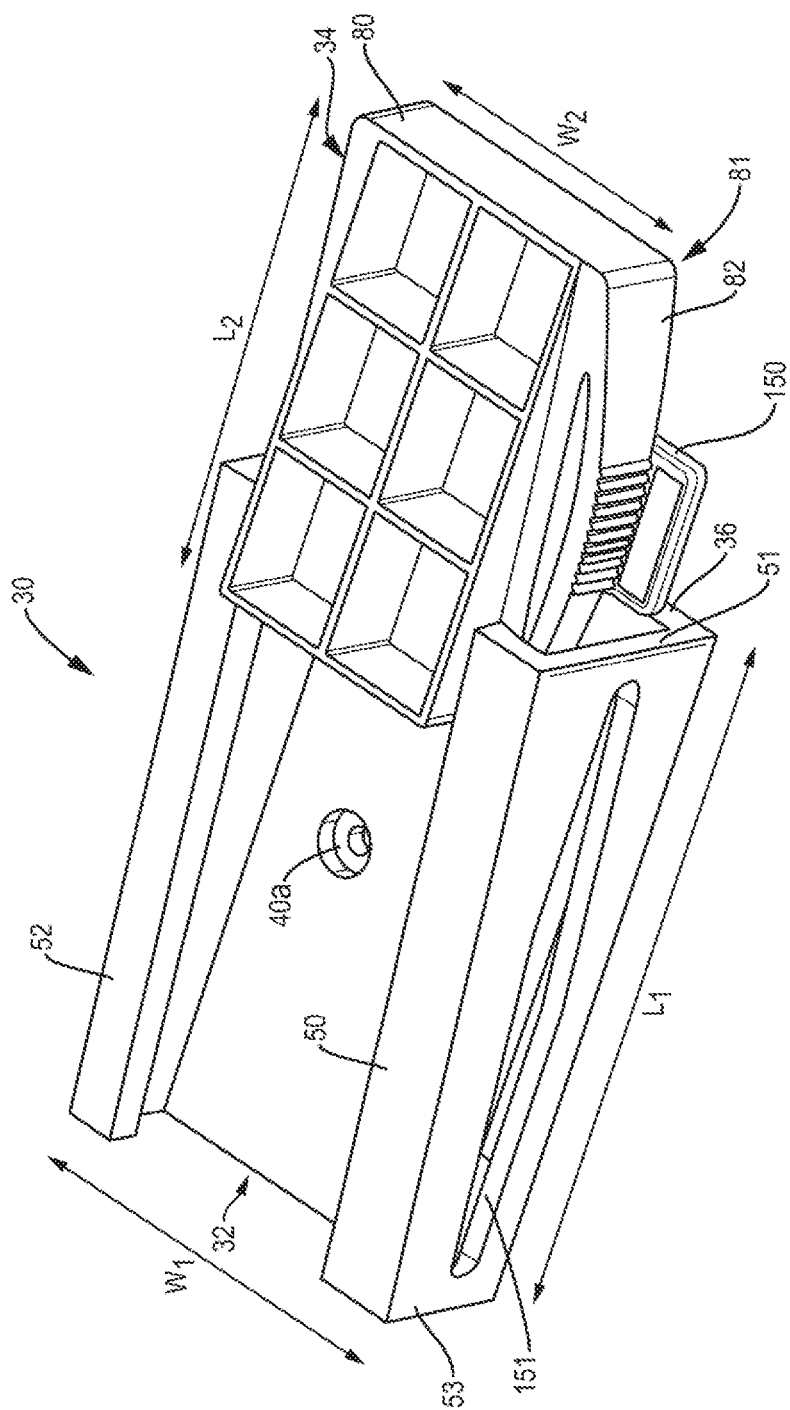
FIG. 2 is a perspective view of a wedge cable clamp according to an aspect of the invention in the open position.

A wedge shaped cable clamp 30 as shown in FIG. 2, includes a rectangular shaped base member 32 having a length, $L_1$, and a width, $W_1$, mated with a rectangular shaped sliding member 34. Sliding member 34 has a length, $L_2$, and a width, $W_2$, which when the sliding member 34 is mated with based member 32, the lengths, $L_1$ and $L_2$ are parallel to each other and the widths $W_1$ and $W_2$, are also parallel to each other. While base member 32 and sliding member 34 may be formed of any suitable material, for ease of manufacture, durability and cost, ABS plastic, from which the parts may be extrusion molded, is preferred. ABS plastic is also elastically deformable, which, as described below, is an aspect required for operation of wedge shaped cable clamp 30.

Figure 1:
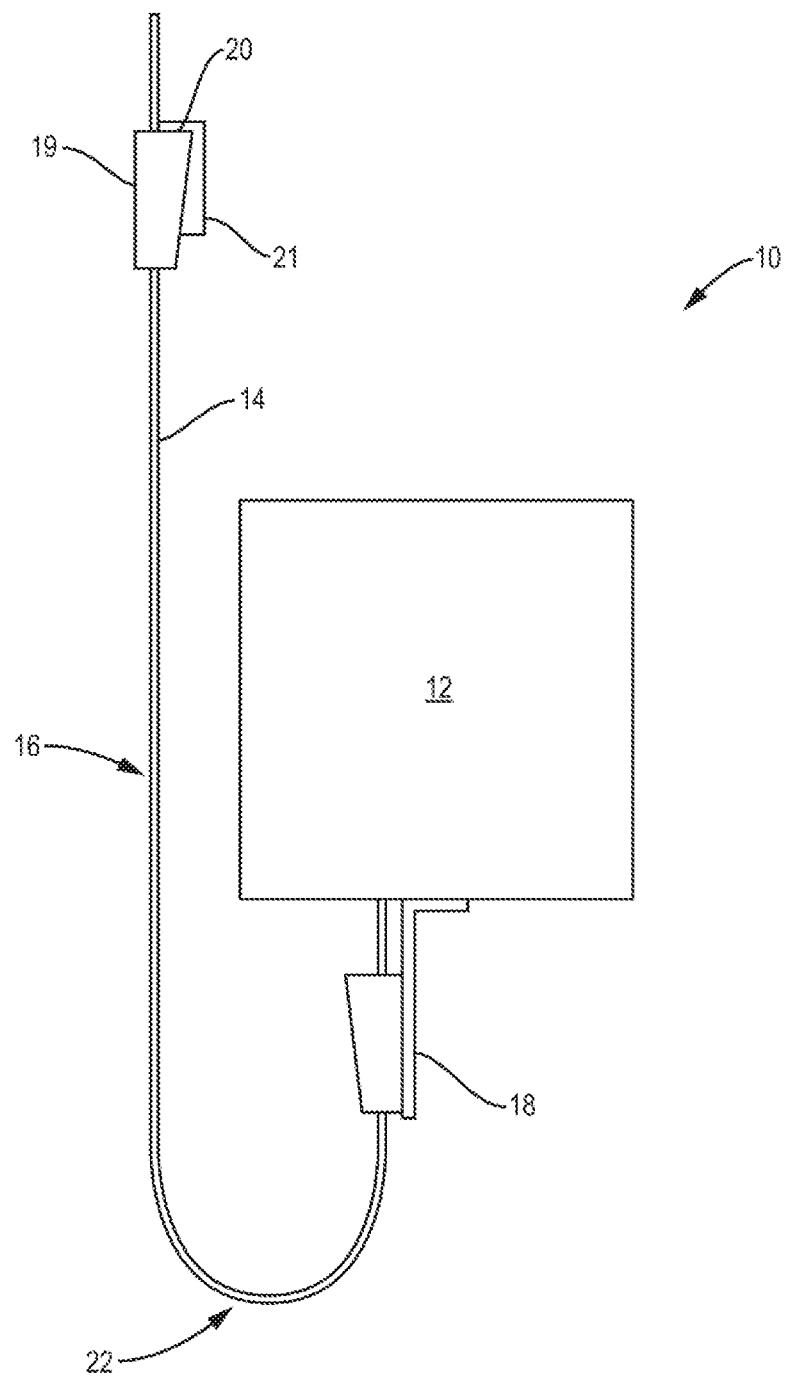
FIG. 1 is a side-elevation view of a prior art wedge cable clamp installed in an elevator shaft to hold in place a power and control cable for an elevator car.

Base member 32 includes a base portion 36 with a substantially flat surface 38 configured to receive and engage with a first side of a cable (not shown). Recesses 40a-40d in surface 38 allow for the insertion of fasteners, typically screws, to affix base member 32 to a surface such as the wall of an elevator shaft, as shown and described above in FIG. 1. The recesses are formed to allow the screws to be countersunk with their heads flush with or below surface 38 so as not to affect the positioning of the cable or to damage it. It should be noted that only recess 40a is visible in FIG. 2 and that recesses 40b-d are visible in other figures. Base member 32 also includes first leg 50 and second leg 52, which are integrally connected to base portion 36.

Figure 3:
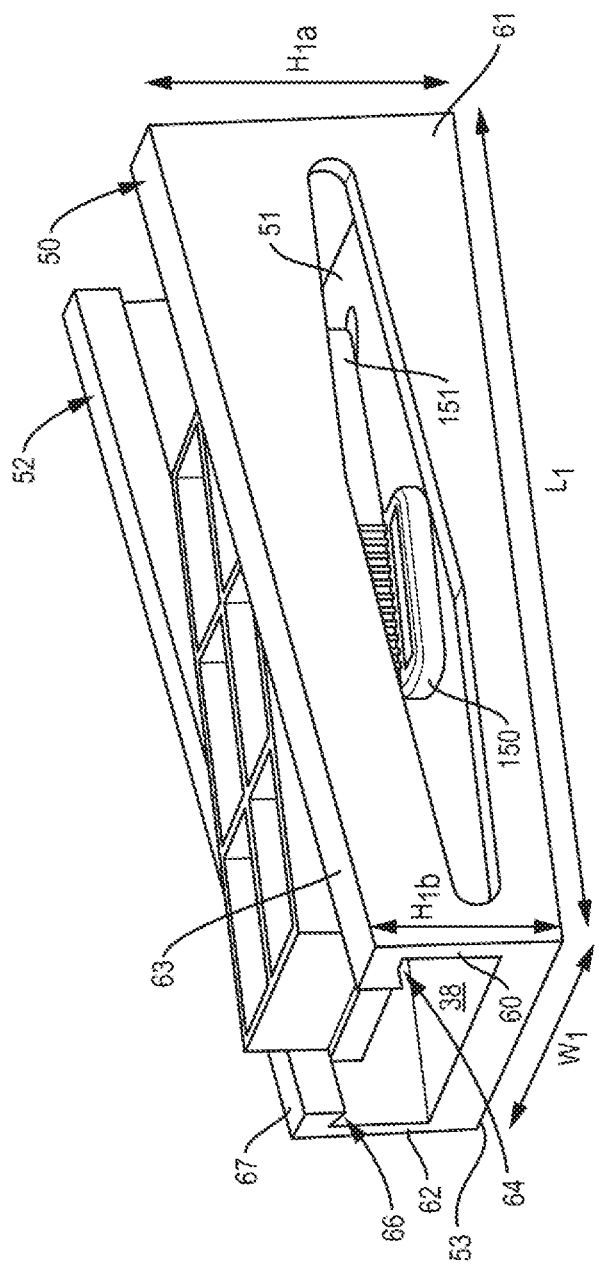
FIG. 3 is another perspective view of the wedge cable clamp of FIG. 1 in the closed position.
Figure 4:
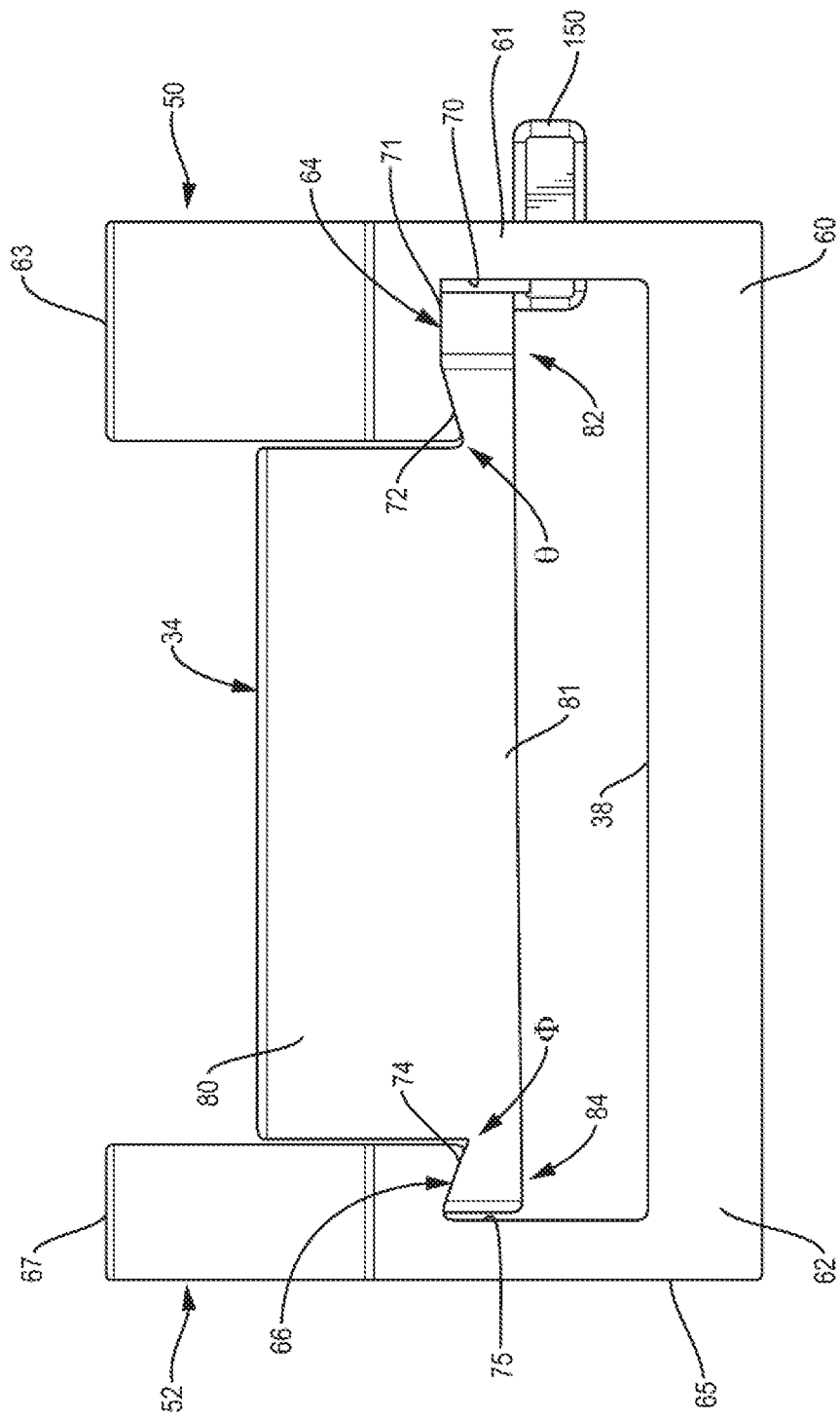
FIG. 4 is an end view of the wedge cable clamp of FIGS. 1 and 2.

Referring to FIGS. 3 and 4, first leg 50 extends along the length, $L_1$, of base member 32 and projects upward from a first side 60 of surface 38. Second leg 52 extends along the length, $L_1$, of the base member 32 and projects upward from a second side 62 of surface 38, opposite the first side 60 and across the width of base member 32.

First leg 50 includes sidewall 61, which is interconnected to base portion 36 at a right angle to surface 38. First leg 50 also includes top rail 63, which is integrated on top of sidewall 61 and extends inwardly over surface 38 at a right angle relative to sidewall 61. As shown in FIG. 4, on the undersurface of top rail 63 is formed first guide rail 64 having an engagement surface including: surface portion 70, which is in a plane intersecting the plane formed by surface 38 of base portion 36; surface portion 71, which is in a plane perpendicular to the plane formed by surface portion 70; and surface portion 72, which is in a plane that intersects the plane formed by surface portion 70 at an acute angle θ.

Similarly, second leg 52 includes sidewall 65, which is interconnected to base portion 36 at a right angle to surface 38. Second leg 52 also includes top rail 67, which is integrated on top of sidewall 65 and extends inwardly over surface 38 at a right angle relative to sidewall 65. On the undersurface of top rail 67 is formed second guide rail 66 having an engagement surface including surface portions 74 and 75. Surface portion 75 is in a plane intersecting at a right angle the plane formed by surface 38 of base portion 36 and surface portion 74 is in a plane that intersects the plane formed by surface portion 75 at an acute angle ϕ.

Referring again to FIG. 3, it can be seen that first and second legs, 50 and 52, each have a height, $H_{1a}$ that decreases from a first end 51 to a height, $H_{1b}$, at a second end 53 along the length, $L_1$, of base member 32 thereby forming a wedge shaped base member. As a result of the decreasing height of the first and second legs, the first and second guide rails, 64 and 66, are similarly disposed at a downward angle from end 51 to end 53 of the base member 32. Thus, first and second guide rails 64 and 66, respectively, are used to engage with portions of sliding member 34 to allow travel of sliding member 34 relative to base member 32 along its length, $L_1$. As sliding member 34 travels with respect to base member 32 along its length, $L_1$, from first end 51 in the first direction to the second end 53, the spacing between the bottom surface of the sliding member 34 and the surface 38 of the base portion 32 decreases, causing increasing pressure to be applied to the cable (not shown). This causes wedge shaped cable clamp 30 to secure the cable.

Returning to FIG. 2, sliding member 34 will be described in more detail. Sliding member 34 includes a body portion 80, which may be rectangular in shape and have a bottom surface 81 spaced from and in opposing relation to surface 38 of the base portion 36 of base member 32. Bottom surface 81 is configured to engage with the side of a cable (not shown) opposite the side of the cable engaged by surface 38. Sliding member 34 has a first engagement member 82 extending along its length, $L_2$, on a first side of body portion 80 and a second engagement member 84 (not visible in FIG. 2) extending along the length, $L_2$, but on a second side of body portion 80, opposite the first side and across the width, $W_2$, of body portion 80.

As shown in FIG. 4, the first and second engagement members 82 and 84, respectively, are affixed to body portion 80 along its length, $L_2$, at an angle corresponding to the angle of the first and second guide rails 64 and 66. This allows surface 81 of body portion 80 to maintain a parallel relationship with surface 38 of base portion 36 as sliding member 34 is moved with respect to base member 32 along its length, $L_1$, in the first direction. As this occurs, the spacing between the surface 81 of the body portion 80 and the surface 38 of the base portion 36 decreases, causing increasing pressure to be applied to the cable evenly across the cable surfaces.

Figure 5A:
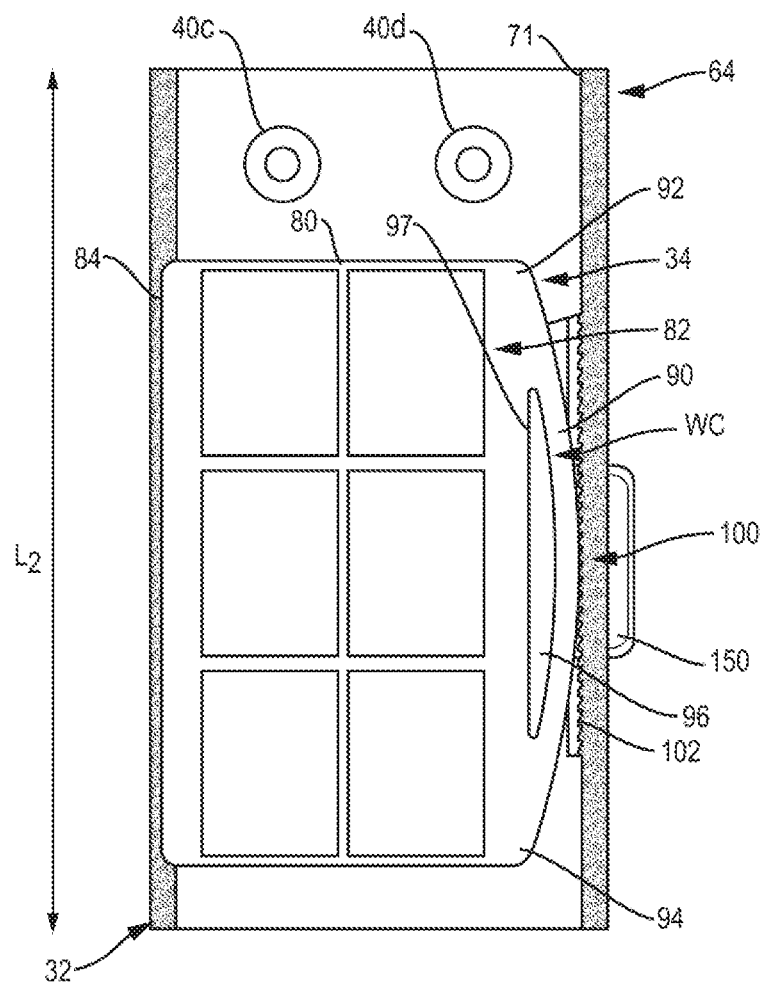
FIG. 5A is a top plan view of the wedge cable clamp of FIG. 2.

Now referring to FIG. 5A, first engagement member 82 comprises convex member 90, which is supported by a first leg 92 affixed to the body portion 80 at first location and a second leg 94 affixed to body portion 80 at a second location spaced from the first location along the length, $L_2$, of the sliding member 32. Convex member 90 is formed with a relatively narrow width, $W_C$, such that a gap 96 is formed between the convex member 90 and side 97 of body portion 80 between the first and second legs 92 and 94. With the narrow width, $W_C$, and the material (e.g. ABS plastic) of the convex member 90, this configuration allows convex member 90 to be elastically deformed in a direction toward the side 97 of body portion 90 when a force is applied to it. Convex member then returns to its original position when the force is removed, which is described further below. Convex member 90 also includes a plurality of teeth 100 disposed on its outer surface in a central region of the convex member.

Continuing to refer to FIG. 5A, first guide rail 64 includes a plurality of teeth 102 projecting outwardly from engagement surface 71 such that the teeth 102 of the first guide rail 64 engage with the teeth 100 on the outer surface of convex member 90 of sliding member 34. As best depicted in FIG. 4, first engagement member 82 also has angled surfaces corresponding to engagement surface portions 70 and 72 of guide rail 64 and second engagement member 84 has surfaces corresponding to engagement surface portions 74 and 75 of guide rail 66. These surfaces of engagement member 82 and 84 frictionally mate to the engagement surface portions 70, 72 of first guide rail 64 and engagement surface portions 74 and 75 of the second guide rail 66.

Figure 5B:
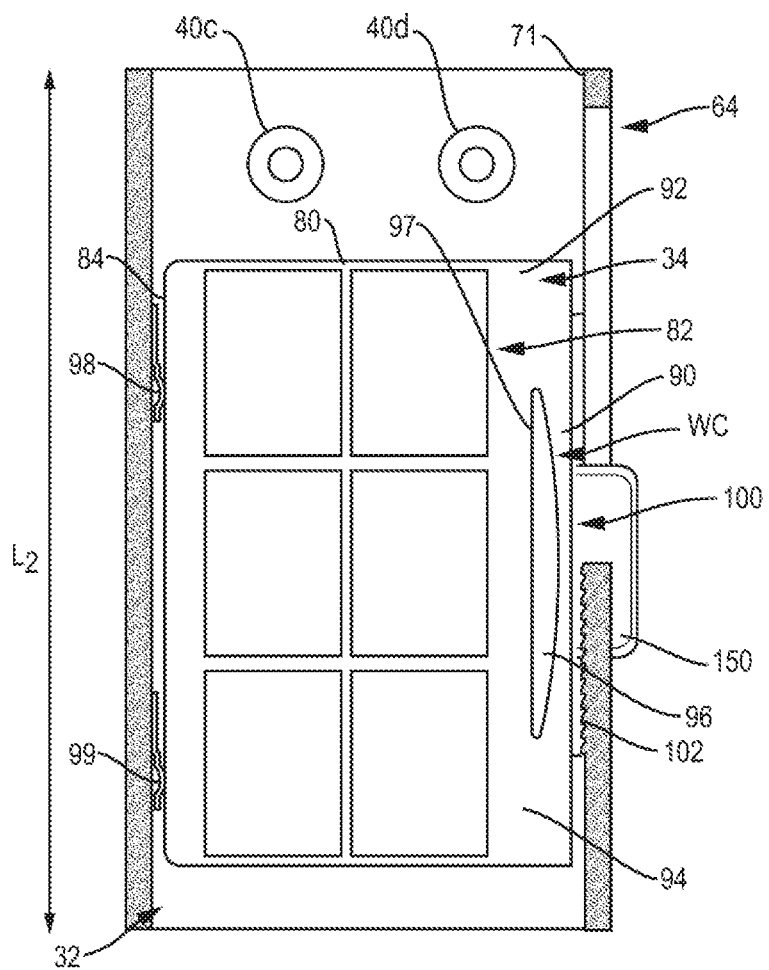
FIG. 5B is a top plan view of the wedge cable as shown in FIG. 5A, including spring mechanisms in the guide rail of the base member.

Thus, the sliding member 34 is movable with respect to base member 32 along its length in the first and second guide rails 64 and 66 by both frictional mating and interaction of the plurality of teeth. As shown in FIG. 5B, spring mechanisms 98 and 99 (e.g. metal band springs) may be affixed to engagement surface 75 of second guide rail 66 to exert force on the body portion 80 to load teeth 100 and 102 together. Alternatively, the spring mechanisms could be disposed on the outer surface of engagement member 84 of body portion 80.

A further feature of wedge clamp 30 is that sliding member 34 is moveable with respect to the base member 32 in guide rails 64 and 66 only in the first direction but not in a second, opposite direction. This prevents the release of the wedge clamp 30 on the cable. The sliding member 34 is moveable only in the first direction due to the interaction of the teeth 102 of the first guide rail 64 with the teeth 100 of the convex member 90 of the sliding member 32. This achieved by configuring teeth 100 and 102 to form a ratchet, which allows movement only in the first direction and prevents movement in the second, opposite direction.

Figure 6A:
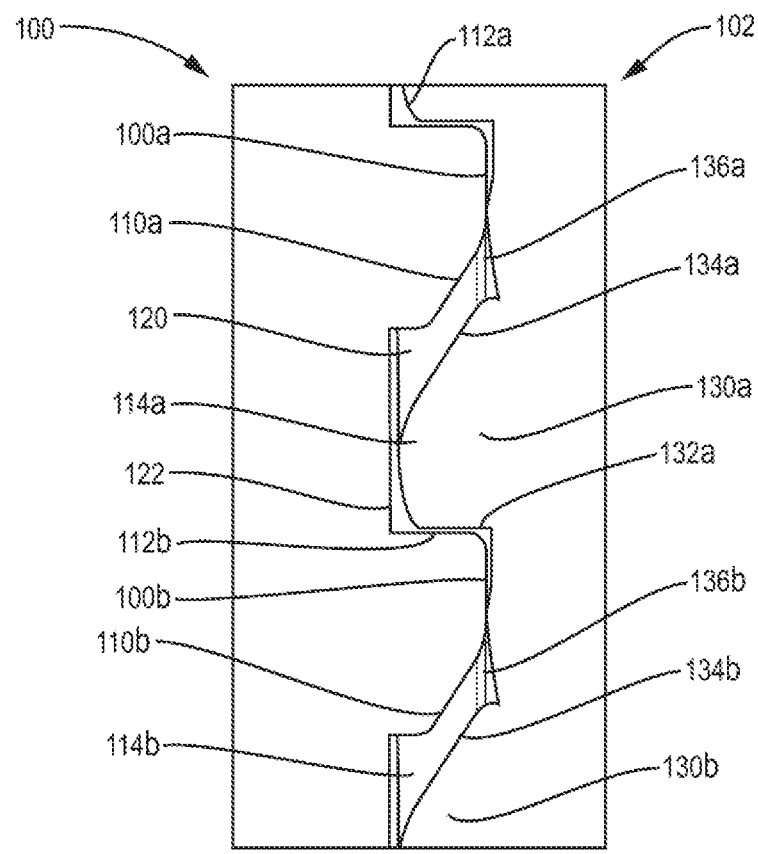
FIGS. 6A and 6B are close-up views of the interaction of the teeth of the wedge cable clamp of FIGS. 1 and 2.
Figure 6B:
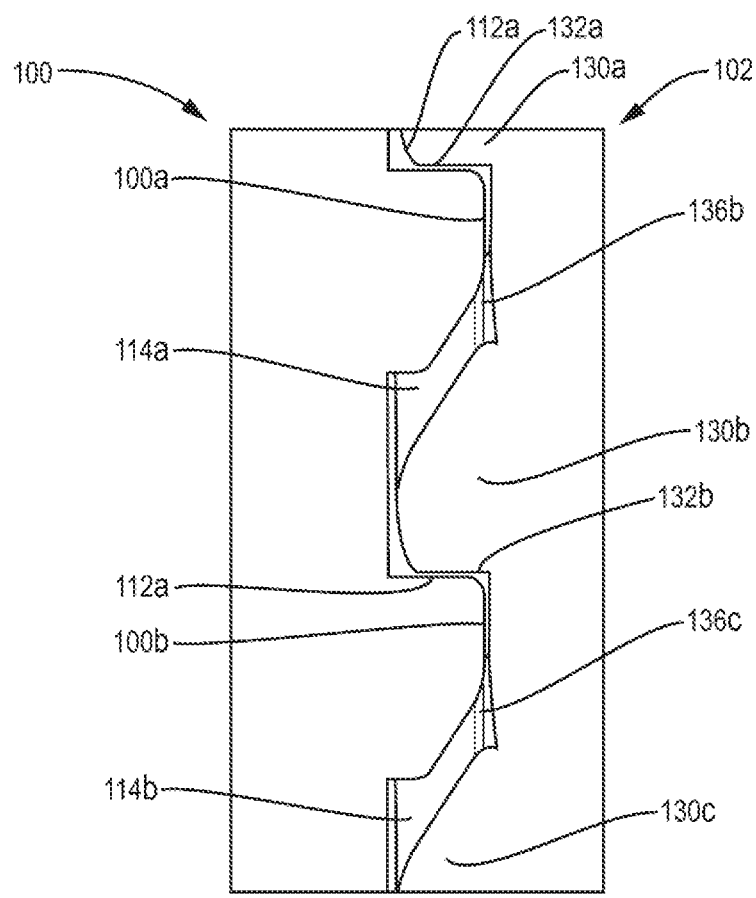

The configuration of the teeth and their operation are described with regard to FIGS. 6A and 6B. Referring to FIG. 6A, each tooth 100a, 100b of the plurality of teeth 100 on the convex member includes a front surface 110a, 110b and a back surface 112a, 112b. Each pair of teeth are separated by a notch, e.g. notches 114a, 114b. The front surface of each tooth, e.g. 110a, is disposed at an acute angle 120 relative to the surface of an adjacent notch, e.g. notch 114a, and the back surface of each tooth, e.g. 112b, is disposed at a perpendicular angle 122 relative to an adjacent notch, e.g. 114a.

Figure 7:
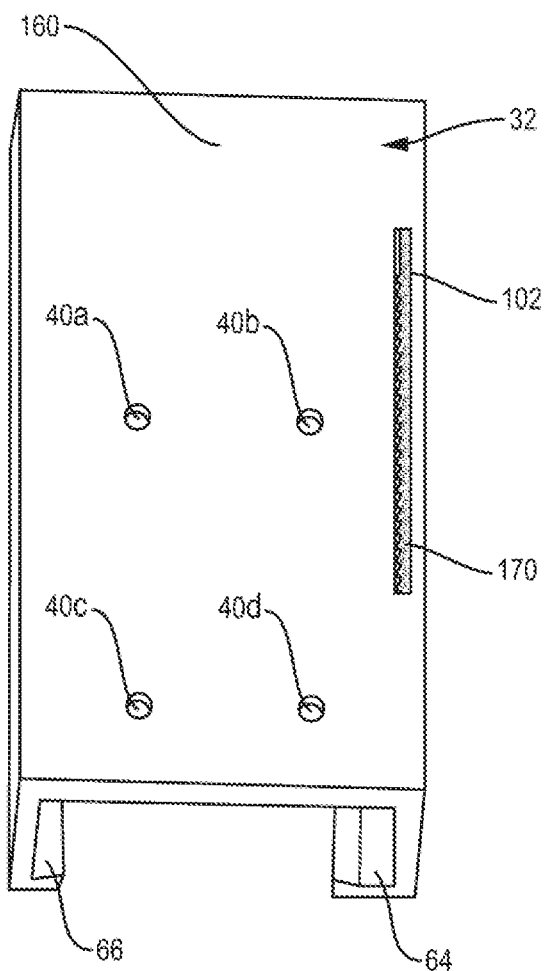
FIG. 7 is perspective view of the bottom of the base portion of wedge cable clamp of FIG. 1.

Each tooth 130a, 130b of the plurality of teeth 102 on the first guide rail 64 includes a front surface 132a, (132b not visible) and a back surface 134a, 134b and each pair of teeth are separated by a notch 136a, 136b. The back surface 134a, 134b being disposed at an acute angle relative to an adjacent notch 136a, 136b and the front surface 132a, being disposed at a perpendicular angle relative to an adjacent notch 136b. The acute angle of the front surfaces 110a, 110b of each tooth 100a, 100b of the convex member 90 is substantially the same as the acute angle of the back surface 134a, 134b of each tooth 130a, 130b on the first guide rail 64. A plurality of teeth 102 on first guide rail 64 are depicted in FIG. 7 through a slot 170 in the bottom surface 160 of base member 32. In one embodiment, once the base member is extruded, a slot 170 is machined through bottom surface 160 and through the slot are machined the plurality of the teeth 102 in guide rail 64.

When the sliding member 34 is not moving relative to the base member 32, e.g. as shown FIG. 6A, each tooth 100a, 100b of the convex member 90 is seated in a notch 136a, 136b, in the first guide rail 64 and each tooth 130a, 130b of the first guide rail 64 is seated in a notch 114a, 114b of the convex member 90. When the wedge shaped clamp 30 is to be engaged to hold in place a cable, the sliding member 32 is moved in the first direction and the interaction of the teeth are described as follows with reference to FIG. 6B.

As shown in FIG. 6A, the front surface 110a, 110b of each tooth 100a, 100b of the convex member 90 impacts the back surface 134a, 134b of a corresponding tooth 130a, 130b on the first guide rail 64 which, due to the respective angles of the surfaces, causes the front surface 110a, 110b of each tooth 100a, 100b of the convex member 90 to ride up the back surface 134a, 134b of a corresponding tooth 130a, 130b on the first guide rail 64. As this is occurring, force is imparted on convex member 90 which causes it to deform in the direction of the first side 97 of body portion 90 (see FIG. 5) until each tooth 110a, 110b of the convex member 90 rides over the complementary tooth 130a, 130b of the first guide rail 64, As the teeth of the convex member 90 ride over their complementary teeth on the guide rail 64, the force on convex member 90 is released and the convex member 90 elastically returns to its normal position causing each tooth of the convex member to be seated in a next notch of the first guide rail 64.

As shown in FIG. 6B each tooth 100a, 100b of the convex member 90 is seated in a next notch relative to their positions shown in FIG. 6A, e.g. tooth 100a is seated in notch 136b and tooth 100b is seated in notch 136c. The back surfaces 112a, 112b of each tooth 100a, 100b of the convex member 90 abuts the front surface 132a, 132b of each corresponding tooth 130a, 130b of the first guide rail 64. This results in front/back perpendicular surfaces being in opposition which prevents movement of the teeth of the convex member 90 and hence the convex member 90 itself in a second direction, opposite the first direction. Thus, the teeth 100 and 130 of the sliding member 134 and the base member 132, respectively, are configured as a ratchet allowing movement only in the first direction to tighten the wedge clamp 30 and not allowing motion in the second direction to prevent the unintentional loosening of clamp 30. In addition, as the teeth ride over one another and the wedge 90 is deformed and then elastically returns to its original position, it causes an audible indication, i.e. a clicking sound, which is helpful feedback to the person using the wedge clamp 30 to know that it is being tightened on the cable.

Movement in the second direction to loosen the wedge clamp 30 is possible but only in the case when release tab 150 (see FIGS. 2-5) disposed in the central region of the convex member 90 is actuated, i.e. pressed in a downward direction to disengage teeth 100 on convex member 90 from the teeth 102 on the first guide rail 64, to thereby allow movement of the sliding member in the second direction. By the application of pressure on the release tab 150 in a direction toward the surface 38 of base portion 36 of base member 32, the convex member 90 is deformed in the direction that the pressure is being applied. When the release tab is no longer being pressed in a downward direction, the convex member elastically returns to its normal position and the teeth are re-engaged or, if the sliding member has been moved far enough in the second direction, the teeth of the convex member may no longer be aligned with the teeth of the guide rail 64 and the clamp will be in the fully open position, as is shown in FIG. 2. Release tab 150 projects through an opening 151 in sidewall 61 of first leg 50 such that it is actuatable from the exterior of the base member 32. The opening 151 extends along the length of the first leg 50 and is positioned below the first guide rail 62.

The spring-loaded ratcheting engagement of the sliding member 34 and the base member 32 easily and conveniently allows tightening but not loosening, until a release button is depressed. In addition, the ratchet provides audible clicks when the sliding member is tightened and the keeps the ratchet portion from seeing any significant load. The audible aspect of the wedge clamp provides feedback for the installer that informs her when tightening the cables. The quick release feature provides a quick way to re-adjust and re-tighten the cables.

While the foregoing description of the invention enables one of ordinary skill to make and use what is considered presently to be the best mode thereof, those of ordinary skill will understand and appreciate the existence of variations, combinations, and equivalents of the specific embodiments and examples herein.

The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above-described embodiments and examples, or embodiments and applications within the scope and spirit of the invention claimed as follows.

What is claimed is:

1. A cable clamp, comprising:
  a base member including a surface configured to receive and engage with a side of a cable, a first leg portion projecting from a first side of the surface and a second leg portion projecting from a second side of the surface; the first leg portion including a first engagement surface having a plurality of teeth and the second leg portion having a second engagement surface; and
  a sliding member including a surface being spaced from and in opposing relation to the surface of the base member and configured to engage with another side of the cable; the sliding member further including a first engagement member extending along a first side of the surface of the sliding member and having a plurality of teeth, and a second engagement member extending along a second side of the surface; wherein the first engagement member is mated to the first engagement surface such that the plurality of teeth of the first engagement surface engage with the plurality of teeth of the first engagement member; and wherein the second engagement member is frictionally mated to the second engagement surface;
  wherein the sliding member is movable with respect to the base member along a length of the base member in a first direction, but is not moveable with respect to the base member along the length of said base member in a second direction, opposite the first direction, due to an interaction of the plurality of teeth of the first engagement surface with the plurality of teeth of the first engagement member;

wherein the first engagement member includes a convex member which is elastically deformable in a direction toward the first side of the surface of the sliding member, and wherein the plurality of teeth are disposed on an outer surface of the convex member; and wherein a gap is formed between the convex member and the first side of the surface of the sliding member.

2. The cable clamp of claim 1 wherein the plurality of teeth of the first engagement surface and the plurality of teeth of the first engagement member form a ratchet, allowing movement only in the first direction.

3. The cable clamp of claim 2 wherein when the sliding member moves in the first direction the plurality of teeth of first engagement surface interact with the plurality of teeth of the first engagement member to produce audible sounds.

4. The cable clamp of claim 2 wherein the convex member includes a central region and wherein the plurality of teeth are disposed on the outer surface of the convex member in the central region.

5. The cable clamp of claim 4 wherein the convex member includes a first leg affixed to the first side of the surface of the sliding member at a first location and a second leg affixed to the first side of the surface of the sliding member at a second location spaced from the first location along the length of the sliding member; wherein the gap is formed between the convex member and the first side of the surface of the sliding member between the first and second legs.

6. The cable clamp of claim 5 wherein each tooth of the plurality of teeth on the convex member includes a front surface and a back surface and each pair of teeth of the plurality of teeth of the sliding member are separated by a respective notch, the front surface being disposed at an acute angle relative to the respective notch and the back surface being disposed at a perpendicular angle relative to an adjacent notch; wherein each tooth on the first engagement surface includes a front surface and a back surface and each pair of teeth are separated by a notch;

the back surface being disposed at an acute angle relative to the respective notch and the front surface being disposed at a perpendicular angle relative to an adjacent the respective notch; and wherein the acute angle of the front surface of each said tooth of the convex member is substantially the same as the acute angle of the back surface of each said tooth on the engagement surface; and wherein when the sliding member is not moving relative to the base member each said tooth of the convex member is seated in a notch in the first engagement surface and each said tooth of the first engagement surface is seated in the respective notch of the convex member.

7. The cable clamp of claim 6 wherein when the sliding member is moved in the first direction, the front surface of each said tooth of the convex member impacts the back surface of a corresponding tooth on the first engagement surface causing the front surface of each said tooth of the convex member to ride up the back surface of a corresponding tooth of the plurality of teeth on the first engagement surface deforming the convex member in the direction of the first side of the sliding member until each said tooth of the convex member rides over the complementary tooth of the first engagement surface and causes the convex member to elastically return to its normal position as each tooth of the convex member is seated in a next notch of the first engagement surface and each tooth of the first engagement surface is seated in the respective notch of the convex member; and wherein the back surface of each said tooth of the convex member abuts the front surface of each corresponding tooth of the first engagement surface such that their perpendicular surfaces are in opposition thereby preventing movement in the second direction.

8. The cable clamp of claim 1 wherein the first leg portion and the second leg portion each have a height which decreases from a first end of the base member to a second end of the base member along the length of the base member and wherein the first and second leg portions include first and second guide rails, respectively, on which are disposed the first and second engagement surfaces, respectively; as a result of the decreasing height of the first and second leg portions, the first and second guide rails are angled downwardly from the first end to the second end of the base member.

9. The cable clamp of claim 8 wherein the first and second engagement members are disposed at an angle relative to the surface of the sliding member corresponding to the angle of the first and second guide rails, such that as the sliding member is moved with respect to the base member along the length of the base member in the first direction, the spacing between the surface of the sliding member and the surface of the base member decreases, causing increasing pressure to be applied to the cable.

10. The cable clamp of claim 5 wherein the convex member further includes a tab disposed in the central region of the convex member to disengage the plurality of teeth on the convex member from the plurality of teeth on the first engagement surface, to thereby allow movement of the sliding member in the second direction, by applying a pressure on the tab in a direction toward the surface of the base portion of the base member.

11. The cable clamp of claim 10 wherein the tab projects through an opening in the first leg of the base member such that it is actuatable from an exterior of the base member, the opening extending along the length of the first leg and positioned below the first engagement member.

12. The cable clamp of claim 1 wherein one of the second engagement member or the second engagement surface includes a plurality of spring mechanisms to exert force on the sliding member to load the plurality of teeth of the engagement member and the plurality of teeth of the engagement surface.

13. A cable clamp, comprising:
a base member having a length and a width, the base member including a base portion with a surface configured to receive and engage with a side of a cable, a first leg portion extending along the length of the base member and projecting from a first side of the surface and a second leg portion extending along the length of the base member and projecting from a second side of the surface, the second side of the surface being opposite the first side of the surface across the width of the base member; the first leg portion including a first guide rail having an engagement surface including a plurality of teeth; the second leg portion including a second guide rail having an engagement surface; and
a sliding member having a length and a width, the sliding member including a body portion with a surface being spaced from and in opposing relation to the surface of the base portion of the base member and configured to engage with another side of the cable; the sliding member having a first engagement member extending along the length of the sliding member on a first side, the first engagement member including a plurality of teeth, the sliding member also having a second engagement member extending along the length of the sliding member on a second side of the surface, the second side of the surface being opposite the first side of the surface across the width of the body portion; wherein the first engagement member is mated to the engagement surface of the first guide rail of the base member such that the plurality of teeth of the engagement surface of the first guide rail engage with the plurality of teeth of the first engagement member of the sliding member; and wherein the second engagement member is frictionally mated to the engagement surface of the second guide rail of the base member;

wherein the sliding member is movable with respect to the base member along the length of the sliding member in the first and second guide rails in a first direction, but is not moveable with respect to the base member along the length of the sliding member in a second direction, opposite the first direction, due to an interaction of the plurality of teeth of the engagement surface of the first guide rail with the plurality of teeth of the first engagement member of the sliding member;

wherein the first engagement member includes a convex member which is elastically deformable in a direction toward the first side of the surface of the sliding member, and wherein the plurality of teeth of the first engagement member are disposed on an outer surface of the convex member; and wherein a gap is formed between the convex member and the first side of the surface of the sliding member.

14. The cable clamp of claim 13 wherein the plurality of teeth of the engagement surface of the first guide rail and the plurality of teeth of the first engagement member of the sliding member form a ratchet, allowing movement only in the first direction.

15. The cable clamp of claim 14 wherein when the sliding member moves in the first direction the plurality of teeth of the first guide rail interact with the plurality of teeth of the first engagement member to produce audible sounds.

16. The cable clamp of claim 14 wherein the convex member includes a central region and wherein the plurality of teeth are disposed on the outer surface of the convex member in the central region.

17. The cable clamp of claim 16 wherein the first engagement member includes a first leg affixed to the first side of the sliding member at first location and a second leg affixed to the first side of the sliding member at a second location spaced from the first location along the length of the sliding member; wherein the gap is formed between the first engagement member and the first side of the sliding member between the first and second legs.

18. The cable clamp of claim 17 wherein each tooth of the plurality of teeth on the first engagement member includes a front surface and a back surface and each pair of teeth are separated by a notch, the front surface being disposed at an acute angle relative to an adjacent notch and the back surface being disposed at a perpendicular angle relative to an adjacent notch; wherein each tooth on the first guide rail includes a front surface and a back surface and each pair of teeth are separated by a notch; the back surface being an disposed at an acute angle relative to an adjacent notch and the front surface being disposed at a perpendicular angle relative to an adjacent notch; and wherein the acute angle of the front surface of each said tooth of the first engagement member is substantially the same as the acute angle of the back surface of each tooth on the first guide rail; and wherein when the sliding member is not moving relative to the base member each said tooth of the first engagement member is seated in a notch in the first guide rail and each said tooth of the first guide rail is seated in a notch of the first engagement member.

19. The cable clamp of claim 18 wherein when the sliding member is moved in the first direction, the front surface of each said tooth of the first engagement member impacts the back surface of a corresponding tooth on the first guide rail causing the front surface of each said tooth of the first engagement member to ride up the back surface of a corresponding tooth on the first guide rail deforming the first engagement member in the direction of the first side of the sliding member until each tooth of the convex member rides over the complementary tooth of the first guide rail and causes the first engagement member to elastically return to its normal position as each tooth of the first engagement member is seated in a next notch of the first guide rail and each tooth of the first guide rail is seated in a next notch of the first engagement member; and wherein the back surface of each tooth of the first engagement member abuts the front surface of each corresponding tooth of the first guide rail wherein their perpendicular surfaces are in opposition thereby preventing movement in the second direction.

20. The cable clamp of claim 13 wherein the first leg portion and the second leg portion each have a height which decreases from a first end to a second end along the length of the base member and wherein as a result of the decreasing height of the first and second leg portions, the first and second guide rails are angled downwardly from the first end to the second end of the base member.

21. The cable clamp of claim 20 wherein the first and second engagement members are disposed at an angle relative to the surface of the body portion of the sliding member corresponding to the angle of the first and second guide rails, such that as the sliding member is moved with respect to the base member along its length in the first direction, the spacing between the surface of the body portion and the surface of the base portion decreases, causing increasing pressure to be applied to the cable.

22. The cable clamp of claim 17 wherein the first engagement member further includes a tab disposed in the central region of the first engagement member to disengage the plurality of teeth on the first engagement member from the plurality of teeth on the first guide rail, to thereby allow movement of the sliding member in the second direction, by the application of pressure on the tab in a direction toward the surface of the base portion of the base member.

23. The cable clamp of claim 22 wherein the tab projects through an opening in the first leg of the base member such that it is actuatable from an exterior of the base member, the opening extending along the length of the first leg and positioned below the first rail.

24. The cable clamp of claim 14 wherein one of the second engagement member or the second engagement surface includes a plurality of spring mechanisms to exert force on the sliding member to load the plurality of teeth of the engagement member and the plurality of teeth of the engagement surface.

* * * * *